UNITED STATES PATENT OFFICE.

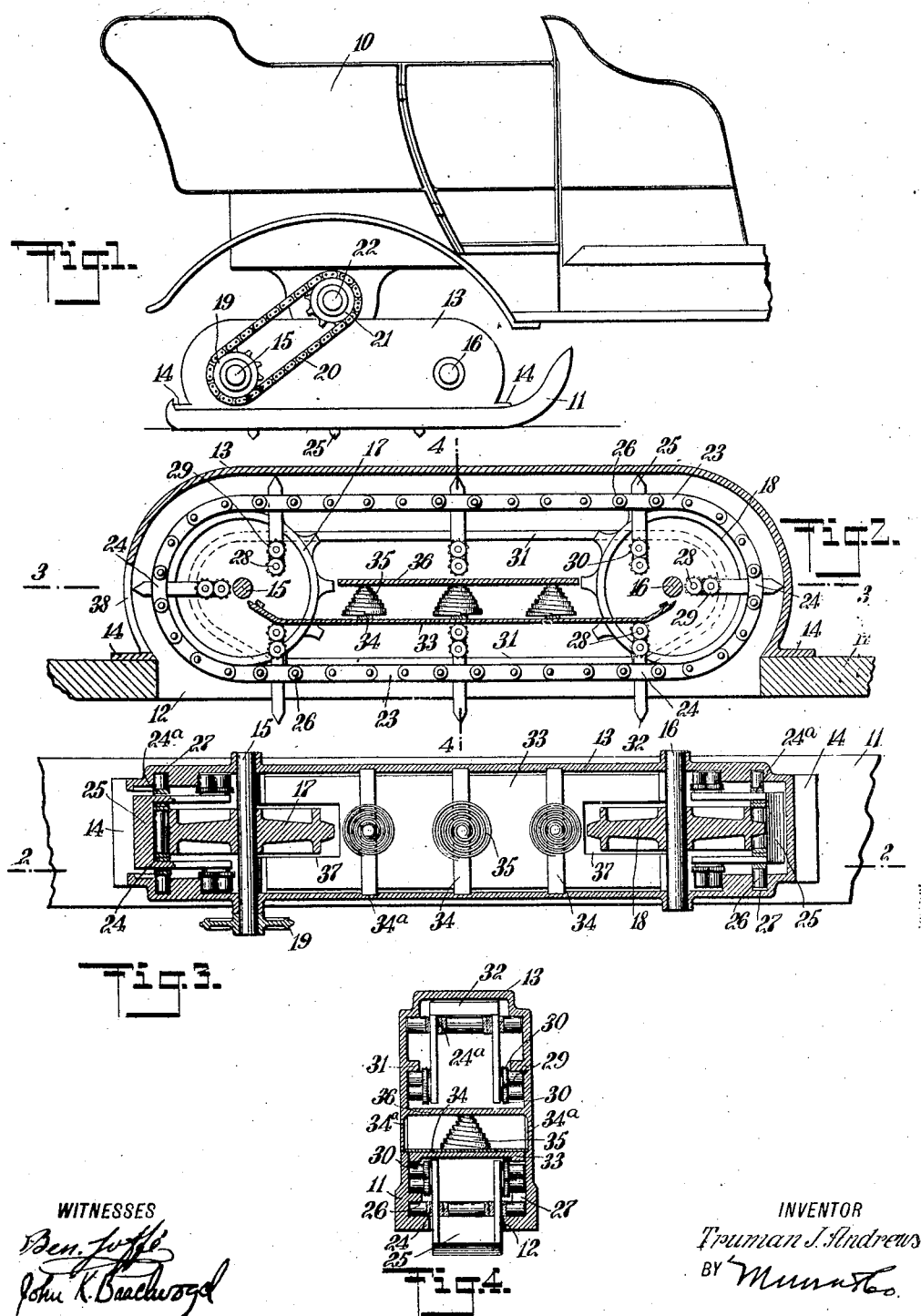

TRUMAN JAY ANDREWS, OF BEMIDJI, MINNESOTA.

TRACTION DEVICE FOR MOTOR-VEHICLES.

968,914.  Specification of Letters Patent.  Patented Aug. 30, 1910.

Application filed November 27, 1909. Serial No. 530,123.

*To all whom it may concern:*

Be it known that I, TRUMAN JAY ANDREWS, a citizen of the United States, and a resident of Bemidji, in the county of Beltrami and State of Minnesota, have invented a new and Improved Traction Device for Motor-Vehicles, of which the following is a full, clear, and exact description.

This invention relates to traction devices for motor vehicles, and is particularly useful in connection with motor sleighs.

It includes an endless traction member arranged to be continuously driven by the motor of the sleigh and having spurs adapted to engage the ground to give the necessary traction, the spurs being movable transversely of the endless member whereby they adjust themselves to the nature of the ground over which the vehicle is traveling.

The object of the invention is to provide a simple, strong and durable traction device for motor vehicles such as motor sleighs and the like, which is compact in form, which is inexpensive to manufacture, which can be applied to motor vehicles of different types, in which the traction member has spurs for engaging the ground to propel the vehicle, the spurs being resiliently adjustable transversely of the traction member so that they adjust themselves for different kinds of surface and ground, and in which the parts cannot easily become clogged through the adhering thereto of earth, snow, and the like.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of the rear part of a motor sleigh having an embodiment of my invention applied thereto; Fig. 2 is an enlarged, longitudinal section on the line 2—2 of Fig. 3; Fig. 3 is a similar view on the line 3—3 of Fig. 2; and Fig. 4 is a transverse section on the line 4—4 of Fig. 2.

Before proceeding to a more detailed explanation of my invention, it should be clearly understood that while the same is particularly useful in connection with motor sleighs intended for travel upon snow or ice, it can also be advantageously employed with other motor vehicles which are propelled by the engagement of continuously moving traction members with the ground or other surface supporting the vehicle. Needless to say, the traction devices can be actuated by any suitable type of motor adapted for the purpose.

As will appear more clearly hereinafter, the endless traction members consisting preferably of chains, have spurs which engage the surface of the ground or other surface upon which the vehicle travels, and penetrate partly into the same, the depth of the penetration depending upon the nature of the surface. These spurs are resiliently adjustable transversely of the traction member so that they regulate themselves automatically, to the surface of the ground and the nature of the same, that is, the comparative softness or hardness thereof. Needless to say, certain of the details of construction can be altered in accordance with individual preference and special conditions, without departing from the underlying spirit of the invention.

Referring more particularly to the drawings, I have shown for example, part of the body 10 of a motor sleigh provided with a suitable driving motor (not shown). At the rear, the vehicle body is mounted upon runners 11, of any suitable type and each having, extending longitudinally thereof, an opening or slot 12, above which is positioned an oblong casing 13, secured upon the runner by means of flanges 14, or in any other suitable manner.

Within the casing, near the ends, are transverse shafts 15 and 16 respectively, carrying sprocket wheels 17 and 18, mounted in suitable bearings in the casing walls. The rear shaft 15 projects through the casing, and at the outside has a second sprocket wheel 19, operatively connected by means of a chain 20, with a sprocket wheel 21. The latter is mounted upon the driving shaft 22, which is actuated by the motor of the vehicle.

Within each casing 13 is located an endless traction member 23, consisting preferably of a chain arranged to travel around the sprockets 17 and 18 at suitable intervals. The chain includes guide links 24, which carry substantially U-shaped spurs 25, slidable transversely of the guide links, in openings 24*, so that the spurs are adjustable transversely of the traction member. The guide links, at the outer ends 26 are arranged to travel in suitable guide grooves 27 at the inside of the casing, to regulate the travel of the traction chain.

The U-shaped spurs, at the sides have laterally extending pins 28 upon which are mounted rollers 29, each having a gear section 30. The rollers are arranged in pairs, with the gears in mesh so that the rollers are constrained to operate together, turning in opposite directions within the casing. At both sides thereof are endless guide ribs or brackets 31 adapted to engage the inner roller 29, that is, the rollers nearer the tapered, effective ends 32 of the spurs. A movable guide member 33, having upwardly disposed extremities is positioned within each casing and has cross bars 34, each engaging a coiled or other spring 35. The ends of the cross bars are movable in guide recesses 34ᵃ, of the casing walls. The springs are held against upward movement by a transverse stop or partition 36. The guide member 33 is arranged to have the spurs pass thereunder with the upper rollers in engagement therewith. The guide member 33 and the guide ribs, are so positioned that the spurs are projected through the slot of the runner at one end of the same, and after they have completed their travel longitudinally of the slot, are retracted. In other words, when the spurs come into engagement with the ground they are forced into the same, and when they approach the end of their travel they are retracted, the movement in each case being transversely of the traction member, and substantially vertical.

It will be understood that owing to the provision of the springs 35, the movable guide member 33, and the stop 36, the spurs will adjust themselves automatically to the nature of the ground, and the penetration of the spurs into the ground will consequently depend upon the comparative softness or hardness thereof. At the end of the casing the guide ribs 31 have upwardly inclined sections corresponding to the upward inclination of the extremities of the guide member 33, so that these parts co-act in regulating the adjustment of the spurs. The provision of the gear sections 30 causes the rollers to have a rolling engagement with the member 33 and the guide ribs so that the friction is reduced to a minimum.

At the ends, the guide member 33 has cutaway parts 37 in which the sprockets 17 and 18 can move without interference. The casing, at the rear, has an opening 38 through which earth, snow or the like can escape to prevent the clogging of the movable parts. The spurs on being withdrawn from the ground or from the snow or ice, are apt to have particles of the material clinging thereto, but they will free themselves on being drawn transversely through the guide links, so that the adhering material can escape through the opening 38, being advanced thereto by the movement of the traction member.

Having thus described my invention, I claim as new, and desire to secure by Letters Patent:

1. A device of the class described, comprising an endless traction member having ground-engaging members movable transversely thereof, and a resiliently-held guide independent of and separate from said member and controlling said ground-engaging members.

2. A device of the class described, comprising an endless traction member having transversely movable spurs adapted to engage the ground, said endless member being adapted to be continuously propelled, and guide means independent of said member for moving said spurs toward and away from the ground, said guide means being partly fixed and partly movable.

3. In a device of the class described, an endless flexible traction member arranged to travel, and spurs carried thereby for engaging the ground, said spurs being movable transversely of said member, and means independent of said traction member for resiliently controlling said spurs.

4. A device of the class described, comprising an endless traction chain, spurs movable transversely of said chain, and guide means controlling said spurs whereby the same can be adjusted transversely of said traction chain as said chain travels, said guide means being separate from said chain and resiliently adjustable.

5. A device of the class described, comprising a casing, a runner supporting said casing, an endless traction member movable within said casing, spurs adjustable transversely of said member, a guide rib controlling said spurs, a guide member co-acting with said guide rib and controlling said spurs, said guide member being movable, and a spring resisting the movement of said guide member.

6. A device of the class described, comprising an endless sprocket chain, means for mounting said chain to travel continuously, said chain having links provided with openings in the sides thereof, U-shaped ground-engaging spurs having the sides movably received in said openings of said links, guide means for said spurs, and rollers carried by said spurs and engaging said guide means.

7. In a device of the class described, a runner, an endless sprocket chain mounted on said runner and extending longitudinally thereof, sprocket wheels around which said chain passes, spurs carried by said chain and adapted to project below said runner, means for driving said chain, means for extending said spurs on their rearward movement with respect to said runner, and means for withdrawing said spurs as they approach the end of their rearward movement.

8. A device of the class described, comprising, in combination, a pair of shafts, sprocket wheels mounted on said shafts, an endless chain passing around said sprocket wheels, spurs guided on said chains and projecting outwardly, and guide means controlling said spurs whereby said spurs are projected when they are moving toward the rear of said runner, and whereby said spurs are retracted when they are moving toward the front of said runner, said guide means being resiliently adjustable.

9. A device of the class described, comprising a runner having a slot extending longitudinally thereof, a casing mounted upon said runner over said slot, shafts journaled in said casing, sprockets carried by said shafts, an endless traction chain arranged to travel around said sprockets, spurs carried by said chain and movable transversely thereof, rollers carried by said spurs, guide ribs within said casing and engaging certain of said rollers, and a resiliently-held guide member engaging others of said rollers.

10. In a device of the class described, an endless traction member, spurs carried by said traction member and adjustable with respect thereto, each of said spurs having a pair of rollers, and guide ribs, each adapted to engage one of said rollers of each of said pairs, said rollers having gear sections in mesh with one another.

In testimony whereof I have signed my name to this specification in the presence of two subscribing witnesses.

TRUMAN JAY ANDREWS.

Witnesses:
JULIA NELSON,
A. M. CROWELL.